April 30, 1974  L. ROZEANU  3,808,105
METHOD FOR CONDUCTING ELECTROLYTIC MEASUREMENT
Original Filed Aug. 2, 1965  5 Sheets-Sheet 1
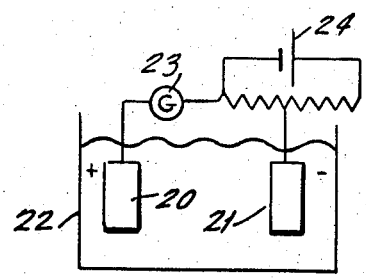
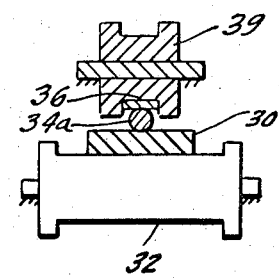
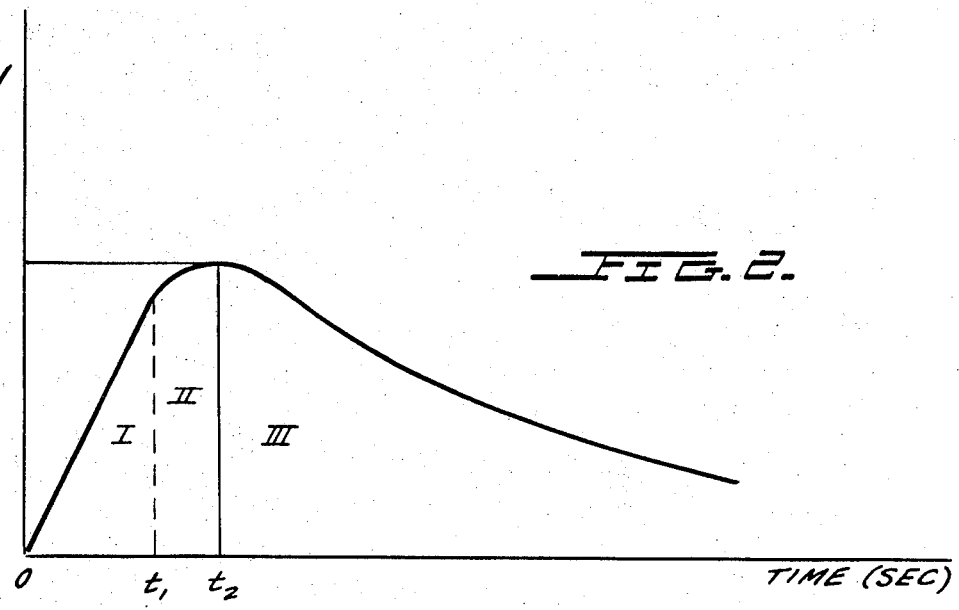
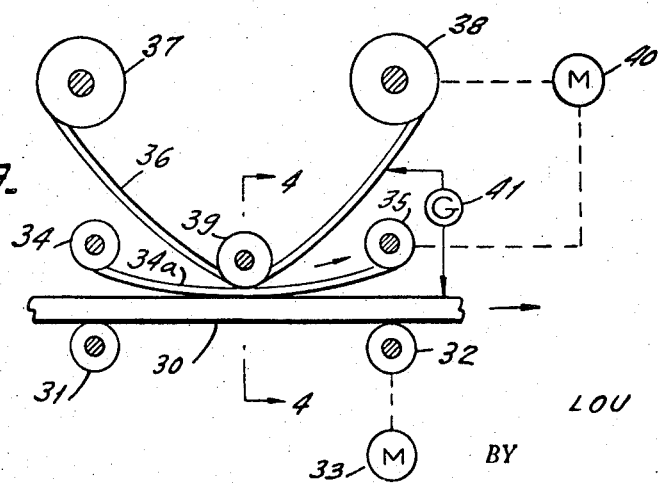
INVENTOR.
LOU ROZEANU
BY
Ostrolenk, Faber, Gerb & Soffen
ATTORNEYS $\Delta t = \Delta t_1 = \Delta t_2 = \Delta t_3 = \Delta t_4$
$\varepsilon = \varepsilon_1 = \varepsilon_2 = \varepsilon_3 = \varepsilon_4$ INVENTOR.
LOU ROZEANU
BY
Ostrolenk, Faber, Gerb & Soffen
ATTORNEYS

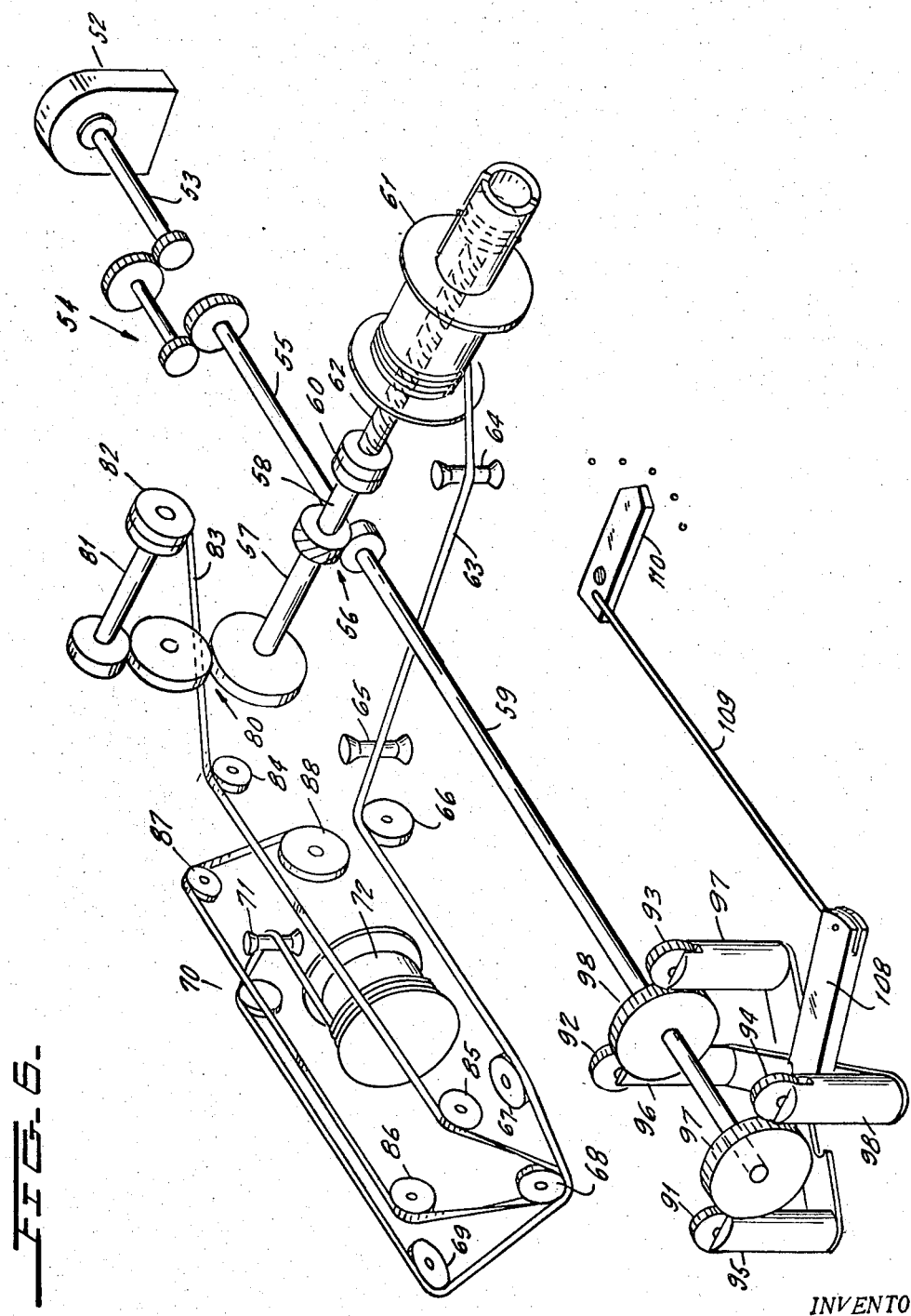

INVENTOR.
LOU ROZEANU
BY Ostrolenk, Faber, Gerb & Soffen
ATTORNEYS

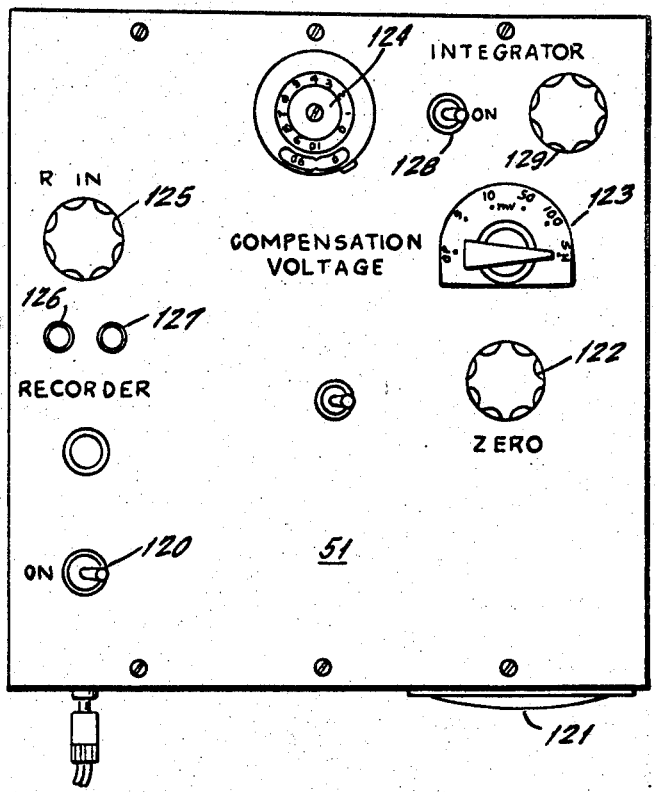
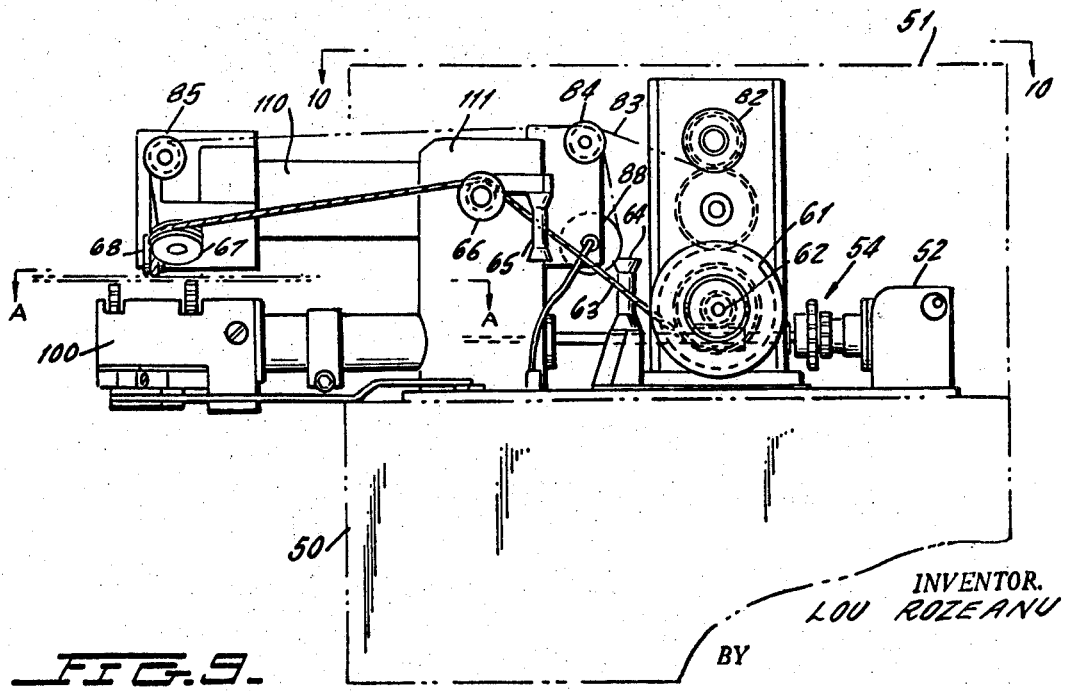

United States Patent Office 3,808,105
Patented Apr. 30, 1974

3,808,105
METHOD FOR CONDUCTING ELECTROLYTIC MEASUREMENT
Lou Rozeanu, Haifa, Israel, assignor to Technion Research and Development Foundation Ltd., Haifa, Israel
Application Aug. 2, 1965, Ser. No. 476,439, which is a continuation-in-part of application Ser. No. 236,506, Nov. 9, 1962, both now abandoned. Divided and this application July 7, 1969, Ser. No. 850,295
Claims priority, application Israel, Apr. 11, 1962, 17,110/62
Int. Cl. G01n 27/46
U.S. Cl. 204—1 T
3 Claims

ABSTRACT OF THE DISCLOSURE

The method for measuring latent stresses in a metallic surface in which the sample being measured is formed as one element of an electrochemical cell which is so constructed as to provide a potential difference between the anode and cathode thereof, which is substantially equivalent to that delivered by a thermodynamically reversible cell. In this cell an anode and a cathode having placed beween them a wick containing an electrolyte are mutually disposed in such a manner as to be in such brief electrical contact with each other through the electrolyte that the electrodes do not attain a state of polarization.

---

This application is a division of copending application Ser. No. 476,439, filed Aug. 2, 1965, in the name of Lou Rozeanu, entitled Method and Apparatus for Conducting Electrolytic Processes, now abandoned, which is, in turn, a continuation-in-part of application Ser. No. 236,506, filed Nov. 9, 1962, now abandoned.

This invention relates to apparatus and a novel method for determining the surface characteristics of metals, and more particularly relates to a novel method for determining latent stresses or the material distribution pattern of a metal which forms a part of the electrochemical cell.

It is well known that any particular metal or alloy, or similar combination of metals will have some identifiable electrochemical potential with respect to another electrode. It is well known that if this material is subjected to any kind of stress due to mechanical working or thermal cycling or any other similar cause, the free energy of the material is effected and the stressed portion of the material will try to give up energy in any possible manner in order to return to its stable condition. Therefore, a stressed portion of a particular material will be more subject to corrosion than when in its unstressed state since by corroding, it will be able to return to a stable energy condition. In a similar manner, metal structures will fail due to fatigue, since by rupturing due to fatigue, the metal gives up the increased energy due to the stress confined in the metal.

It is very desirable to be able to measure the stress condition in such metals since one can then locate areas subject to corrosion or fatigue before the corrosion or fracture has occurred. A great number of other conditions can be determined once this latent stress condition is discovered. Thus, it would be possible to continuously monitor the stress condition of a metallic sheet material being drawn or formed in any process; to study the complete surface of statistically selected samples from a manufacturing process; and to study prototype models of apparatus to determine the effect of shape or manufacturing process on stress within the model or the corrosibility over the entire model surface.

The measurement of such stress conditions can be accomplished by measuring the electrochemical potential of the material since this will vary from the value which it would have when the material is in its stable condition.

When a metal being stressed is of such a nature that it can be used as an electrode in the usual reversible electrochemical cell, these measurements can easily be made since once a current path is completed, the electrochemical potential will rise to its predetermined value and hold constant at this value. Thus, when using this type material, one can measure its output voltage in a reversible electrochemical cell and compare this to its predetermined unstressed or stable value to determine if the metal is under some particular stress.

Most metals, however, when used in an electrochemical cell, form a part of an irreversible cell. It can be shown from well-known considerations of thermodynamics that in an irreversible cell a true measurement of the free energy of the material is available only during the interval while the output voltage of the cell begins to rise. Depending on the metal used, this rise time will be of the order of $2/10$ of a second at the end of which time a peak is reached. Thereafter, and due to polarization effects, the output voltage decreases to some constant value. Because of the polarization, however, the free energy of the material is not necessarily related to the final polarized voltage output.

It is a primary object of this invention to provide a novel method for measuring the energy conditions of metal.

Another object of this invention is to provide a novel method and apparatus for the measurement of energy conditions of a metal, which includes the formation of an electrochemical cell of which the metal being studied forms one electrode with the two cell electrodes being continuously replaced and with the electrolyte being continuously replaced.

Another object of this invention is to provide a novel means for scanning the surface of a metal to determine the energy conditions of the surface.

Another object of this invention is to provide a novel electrochemical reversible cell using electrochemical materials which normally define irreversible electrochemical cells.

Yet another object of this invention is to provide a novel measuring instrument for determining the tendency of a metal to corrode.

Yet another object of this invention is to provide a novel apparatus for determining latent stress conditions of a material.

Still another object of this invention is to provide a novel apparatus for determining the homogeneity of an alloy body.

These as well as other objects of this invention will become readily apparent after reading the following specification in connection with the accompanying drawings, in which:

FIG. 1 schematically illustrates a well-known type of electrochemical cell with a countervoltage circuit.

FIG. 2 is a characteristic curve which illustrates the output voltage of a cell of the type shown in FIG. 1 as a function of time.

FIG. 3 schematically illustrates an apparatus constructed in accordance with the present invention.

FIG. 4 is a cross-sectional view of FIG. 3 taken across the lines 4—4 in FIG. 3.

FIG. 5 schematically illustrates the manner in which a continuous output is generated by the apparatus of FIGS. 3 and 4 as continuously measured on the rise portion of the output voltage curve.

FIG. 6 schematically illustrates the essential components of a specific apparatus constructed in accordance with the present invention.

FIG. 10 is a top view of the top lid of the apparatus of FIGS. 7, 8 and 9 and is a view seen from the arrows 10—10 in FIG. 9.

Figure 8:
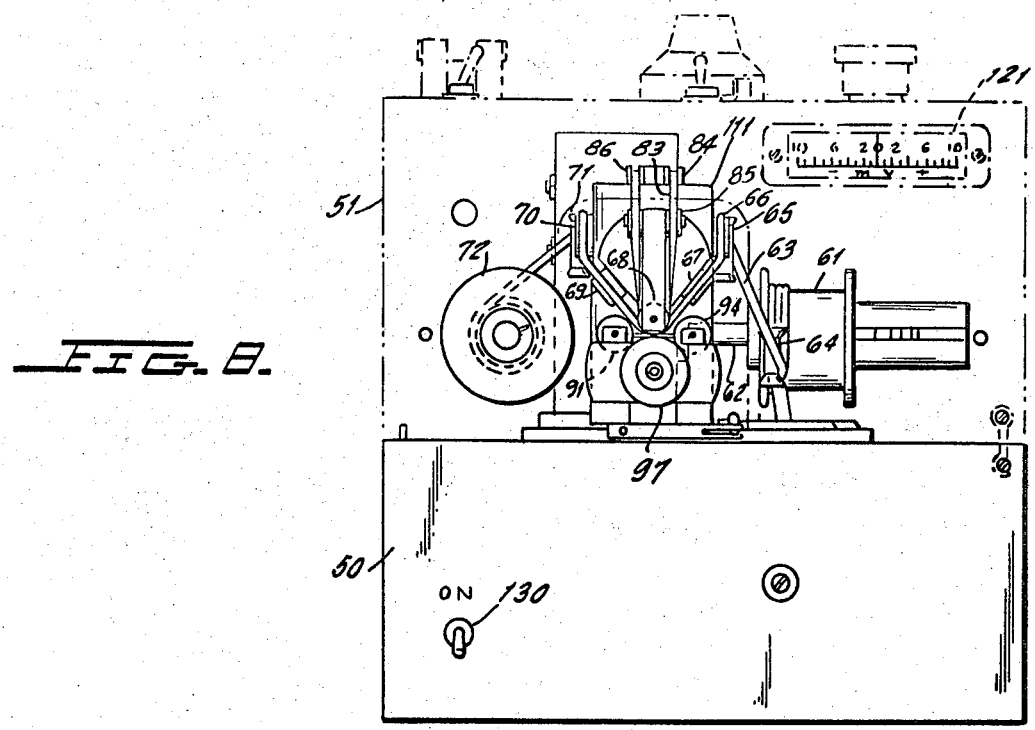
FIG. 8 is a front view of FIG. 7 with the top lid of the apparatus indicated in dot-dash lines.
Figure 9:
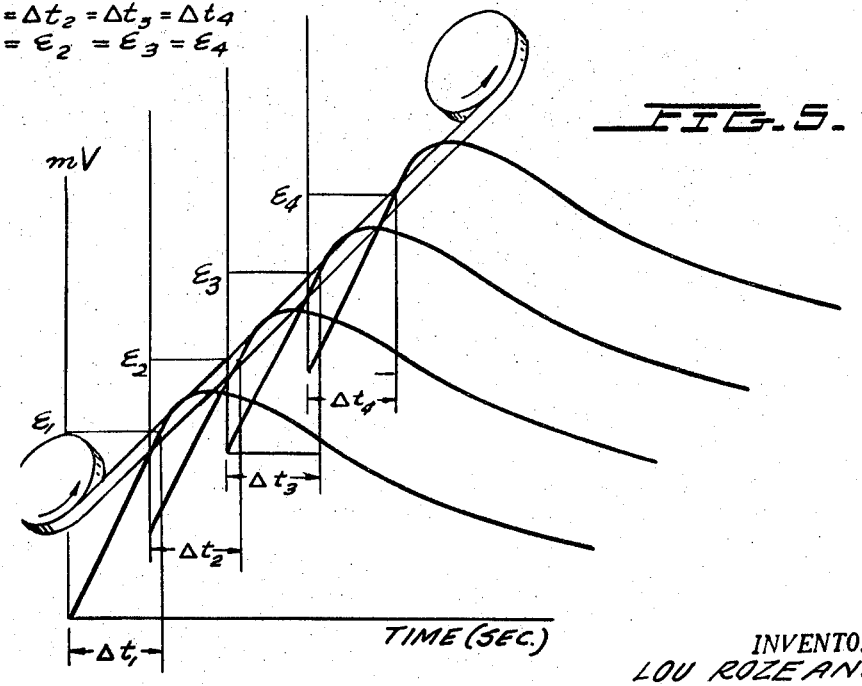
FIG. 9 is a side view of the apparatus of FIGS. 7 and 8 with the top lid and bottom housing indicated in dot-dash lines.

Referring first to FIG. 1, I have schematically illustrated therein a typical electrolytic cell composed of a suitable anode plate 20 spaced from a suitable cathode plate 21 within a container 22 of some suitable electrolyte.

As is well known and if suitable anode and cathode metals are chosen with a suitable electrolyte, the anode 20 will deliver a charge of positive ions and will pass an electrical current through a conductor connected between anode and cathode electrodes. Thus, if a galvanometer such as galvanometer 23 is connected in this circuit, it will show a deflection due to the generation of a potential difference between anode 20 and cathode 21.

It is also well known that cells of this type are subject to polarization effects which limit the electromotive force available between anode 20 and cathode 21. These effects are due to many diverse phenomena such as space charge and the formation of gases about the electrodes. Because of these polarization effects, the output voltage generated by an electrolytic cell, particularly of the irreversible type, will initially rise for a short time and will thereafter decrease to its polarized value as determined by polarization effects in the anode, cathode and electrolyte. It can be shown by considerations of thermodynamics that the internal energy condition of the materials used as electrodes will vary the output voltage of the cell using this material from its expected theoretical value.

In order to overcome these polarization effects and thus obtain a true measure of the theoretical output voltage of the cell, attempts have been made in the past to provide an opposing voltage source to the output voltage of the cell which prevents current flow from the cell and thus attempts to prevent polarization effects.

Thus, as schematically illustrated in FIG. 1, a battery such as battery 24 has been connected in a potentiometer circuit in opposition to the normal output voltage of the cell. In effect, this was an attempt to force conditions of reversibility of the thermodynamic process occurring within the cell and is know in the art as the Poggendorf potentiometric method. While this method at first appeared to offer some promise of obtaining an output voltage independent of polarization effects, it has been found that polarization effects still occur due to the formation of local cells over the surface of each electrode. Therefore, polarization slowly builds up, thereby to mask the true output voltage of the cell or that voltage which is the theoretical output voltage of the cell as effected by its internal energy condition.

Therefore, it has been heretofore impossible to separate the true output voltage of the cell from its polarization effects due particularly to these localized cells which cause polarization within the plates even though current does not flow in the load circuit.

The principle of the present invention is to form a novel electrochemical cell which reacts as would a true reversible cell in that I can obtain a measure of output voltage of the cell, is modified only by its internal energy conditions, and which is independent of polarization effects.

Thus, as shown in FIG. 2 where a typical electrochemical cell has an external circuit connected to a load, the output voltage of the cell rises from zero at the time of connection toward a peak value. During this rise time, the cell exhibits true reversible effects in that polarization of anode, cathode and electrolyte does not yet modify the cell output voltage. This unaffected voltage output, however, exists only for a short time where, for example, the value $t_1$ could be of the order of ½ second for a typical cell. Thereafter, polarization effects set in so that the output voltage begins to decrease as shown after time $t_2$ due to polarization effects.

In more detail and referring to FIG. 2, in the first region I the anode is being freely dissolved into the electrolyte and forms ions giving rise to an electrolytic current. That is, the ions will flow from anode to cathode in the usual manner and are neutralized by electrons which have passed through the electrical circuit. If these ions are of the same material as the cathode they will deposit upon the cathode as usual or if they are of another material they will diffuse into the solution according to their physical state. That is to say, if the resulting product is a gas such as hydrogen, it will evolve to the atmosphere.

At the end of interval I in FIG. 2 the ions flowing through the electrolyte finally define a sufficiently high electrostatic charge or space charge to begin to slow down the process. Thus, during the interval II new ions find it more and more difficult to go into solution so that the output voltage of the cell stabilizes and, during interval III the output voltage begins to decrease towards some equilibrium value.

At the same time, a secondary effect takes place at the cathode known as cathode polarization. The result is that the voltage output in interval II and in interval III is not necessarily related to the theoretical output voltage of the cell since the true output voltage of the cell is masked by polarization effects.

During the rise time in interval I, however, the output voltage is a true measure of the characteristic metal used for the anode whereby a measurement of this output voltage reveals a value which is particularly related to the composition of the anode. Moreover, where this value differs from some predetermined value this difference is directly related to variations of the energy state of the material from its unstressed and stable value.

In accordance with the present invention, a novel scanning structure is provided wherein only a particular point on this portion of the curve is measured thereby indicating the energy conditions of the material being evaluated.

The novel apparatus of the invention is schematically illustrated in FIGS. 3 and 4 wherein the sample 30 being tested serves as the anode of an electrochemical cell. Material 30 is then supported as by suitable rollers 31 and 32 which cause material 30 to continuously move along its axis. By way of example, a suitable drive motor 33 could be connected to roller 32. A pair of bobbins 34 and 35 then carry an electrolyte-containing wick which is held between the sample 30 and a cathode strip 36 which is carried between reels or bobbins 37 and 38. Thus, the bobbins 34 may have a cotton wick wound therein which are saturated with some suitable electrolyte. If desired, the sample 30 may be made cathode and the strip 36, the anode.

The cathode material 36 which could be of any desired material is also stored on reel 37 whereupon as the sample 30 moves in an axial direction, the electrolyte-containing wick 34a from reel 34 traverses with sample 30 and is wound upon takeup reel 35. Similarly, the cathode strip 36 continuously unwinds from reel 37 under the guide roller 39 and is wound on the takeup reel 38. If desired, a separate motor drive structure may be connected to takeup reels 35 and 38, as illustrated by dotted lines.

The end result is that an electrochemical cell is formed between the surface of sample 30, the electrolyte within wick 34a and the cathode region 36 at the region where these elements are pressed together by guide 39.

Furthermore, the particular anode area, cathode area and electrolyte are continually replaced at a speed sufficient to remove any specific area of the cell from the cell-forming area prior to polarization effects in the particular materials defining the cell. That is to say, by causing sample 30, wick 34a and region 36 to move at some predetermined rate, the output voltage generated by the sample 30 and cathode 36 as measured, for example, by galvanometer 41 may be directly related to some predetermined point on the rising voltage curve of FIG. 1. Thus, if all other conditions remain equal, it will be apparent that the galvanometer 41 will measure varying output voltages which are related solely to variations in the internal energy content of sample 30 since polarization effects have been eliminated. This result is of considerable importance since it is now possible to determine latent stress conditions within the material or conditions such as the tendency of localized area of material to corrosion.

The effect of the novel structure of FIGS. 3 and 4 is particularly illustrated in FIG. 5. Thus, FIG. 5 schematically illustrates a plurality of curves such as that shown in FIG. 2 superimposed upon one another for a particular speed of movement of the various cell components in FIGS. 3 and 4. Thus, the curve labeled curve 1 in FIG. 5 indicates in a schematic manner that the particular area defining the localized electrochemical cell in FIGS. 3 and 4 will exist for a time $\Delta t_1$. During this time, the output voltage of the cell rises to the value of $E_1$. However, since the cell components are continuously changed, there will be overlapping areas shown, for example, as curve 2 wherein a new cell area exists for a time $\Delta t_2$. If the speed of movement of the cell components is properly chosen, then the voltage during the time $\Delta t_2$ can be thought of as rising to a value $E_2$ which is identical to $E_1$. In a similar manner and as the components continue to move, they can be thought of as defining new curves 3, 4 and so on having time duration of $\Delta t_3$ and $\Delta t_4$ and so on, respectively, causing output voltages $E_3$ and $E_4$ and so on, respectively. Thus, the total output voltage measured by galvanometer 41 will be the value $E_1$. Clearly, by changing the speed of movement of the components, the absolute output voltage value will vary. However, so long as the speed of movement is such that the measured voltage is on the rising portion of the curve of FIG. 2 variations from area to area of sample 30 will be those due only to different internal energy situations within the sample. Thus, one can locate latent points of corrosion within a sample which are otherwise undetectable.

A particular apparatus which has been built to carry out the functions schematically illustrated in FIGS. 3 and 4 is more particularly shown in FIGS. 6–13. FIG. 6 will be emphasized since FIG. 6 illustrates the important moving components of the apparatus contained within some suitable housing such as the housing 50 of FIGS. 7, 8 and 9 which has a top lid 51 shown in FIGS. 8, 9 and 10. The mechanism carried within lower housing 50 comprises a suitable drive motor 52 which has an output shaft 53 (FIG. 6) which has a suitable motion reducer gear system 54 which permits a low rotational speed of shaft portion 55 (FIG. 6). The shaft 55 is then connected through a suitable gear system 56 to output shafts 57, 58 and 59. Shaft section 58 is connected through a suitable friction clutch 60 to a takeup reel 61 carried on rotatable shaft 62. Note that shaft 62 is threaded in order to permit adjustment of the bobbin on takeup reel 61. It should be further noted that takeup reel 61 corresponds to takeup reel 35 of FIG. 3.

The takeup reel 61 then receives an electrolyte saturated cotton wick 63 which rides over guide posts 64 and 65 and over direction controlling pulleys 66, 67, 68, 69, 70, guide post 71 and supply reel 72. It will, therefore, be apparent that the motor 52 will cause reel 61 to drive in such a manner as to pull the electrolyte-containing wick 61 beneath pulley 68, at which point, contact is being made between the sample which defines the anode and a cathode region.

The drive system for the cathode region begins with shaft 57 and extends through gear train 80, shaft 81, and a bobbin 82 to which one end of a ribbon 83 is secured and wound upon. Then ribbon 83 extends over pulley 84, pulley 85, the pulley 68, pulley 86, pulley 87 and a supply reel 88. Therefore, because of this drive system, the ribbon carried on supply reel 88 is continuously pulled over pulley 68, preferably at the same speed as wick 63, and is ultimately wound upon bobbin 82. It is to be specifically noted that pulley 68 is of insulation material whereby the cathode wire 83 can be suitably connected to one terminal of a suitable voltage indicating instrument.

The other terminal of the instrument is composed of the sample itself schematically illustrated in FIG. 3 by surface portion 90. This sample portion 90 will ride upon four driven wheels 91, 92, 93 and 94 which are pivotally carried on movable support posts 95, 96, 97 and 98, respectively.

Figures 11, 12, 13:
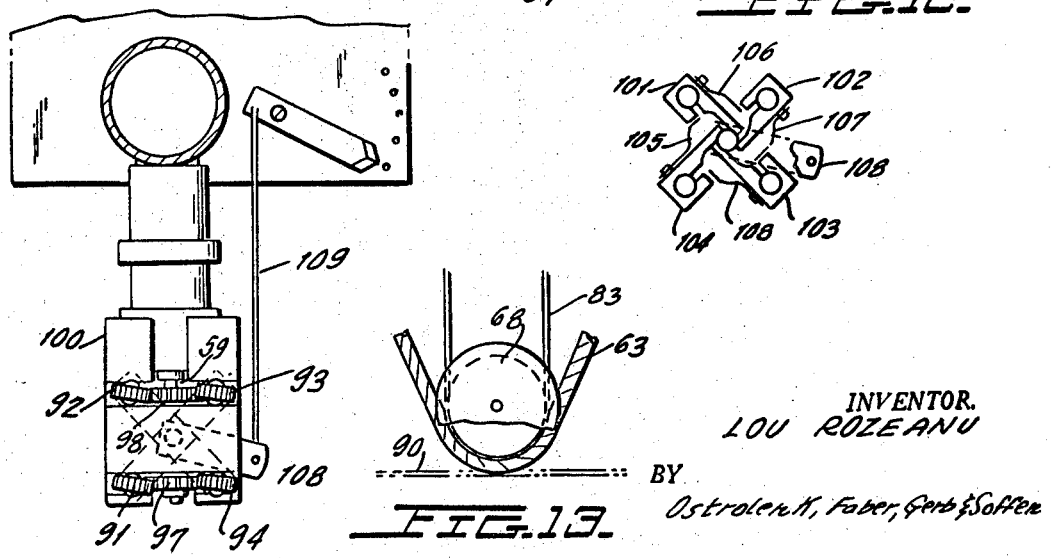
FIG. 11 is a top detailed view illustrating the sample drive mechanism in the apparatus of FIGS. 7, 8 and 9.
FIG. 12 is a further detailed view of the adjustment mechanism for the sample drive.
FIG. 13 is an enlarged detailed view illustrating the cooperation between the cathode wire, the electrolyte, containing-wick and the sample under measurement which serves as the anode.

Each of drive wheels 91–94 are serrated and are engaged by serrated nylon drive wheels 97 and 98 which are driven from shaft 59. Thus, wheels 97 and 98 cause each of drive wheels 91–94 to continuously rotate whereupon a sample placed atop one of these wheels will be driven thereby. It will be noted that the posts 94–97 are axially rotatable with respect to the stationary mounting body comprising the extension 100. Each of posts 95–98 are then carried in a suitable pair of support members such as supports 101, 102, 103 and 104, respectively, each of which are provided with biasing springs 105, 106, 107 and 108 for biasing them to predetermined positions with respect to one another, as shown in FIG. 12. Input lever 108 is then connected to a connecting rod 109 (FIGS. 7 and 11) which is in turn connected to a pivotally mounted adjustment member 110 which is pivotally mounted by screws 111.

This arrangement is particularly desirable where a cylindrical subject is to be tested whereupon the cylindrical subject is placed over extension 100 and sits upon wheels 91–94. During the drive the cylindrical sample is then caused to be screwed in or out whereby a helical surface area is scanned.

Figure 7:
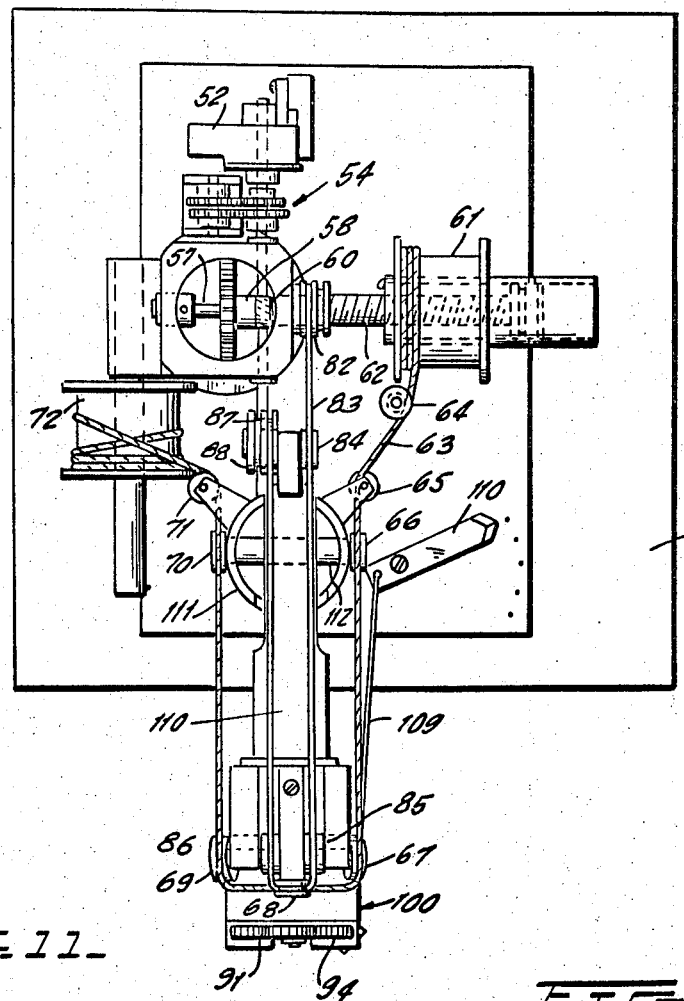
FIG. 7 is a top view of the apparatus illustrated in FIG. 6 contained within its housing and with the top lid of the apparatus removed.

Moreover, and in order to permit the placement of a sample between the bottom of the wick 63 and the drive wheels, the assemblage 110 which carries the various pulleys such as pulleys 66, 67, 68, 69, 70 and 84, 85, 86, 87 is pivotally mounted to the central mounting post 111 by a pivot pin 112 best seen in FIG. 7. Therefore, the structure 110 may be raised up and the sample to be measured placed atop drive wheels 91–94 with the pivotal assembly 110 thereafter dropped upon the upper surface of the sample. If desired, a suitable spring biasing means (not shown) may be provided to bias the structure, including pulley 68, downwardly and into pressure contact with the sample to be measured.

It is to be further noted that the drive wheels 91–94 are connected to the various metallic components of the assemblage which serves as the other terminal for the electrochemical cell formed by the apparatus. Generally, it is only important to have suitable insulation components to electrically insulate the sample from the cathode wire 83.

The upper housing or lid of the apparatus then carries the various electrical equipment used to measure the output voltage of the novel electrochemical cell formed between the engagement of wire or ribbon 83, surface portions of member 90 and the electrolyte carried in wick 63. Thus, as schematically illustrated in FIG. 10, the top surface of the lid may serve as a control panel containing an on-off switch 120 for galvanometer 121 (FIGS. 8 and 10). In addition, the usual electrical equipment may be provided including zeroing knob 122; a range adjustment switch 123 for controlling the scale range of potentiometer 121 and an adjustment means 124 for providing an adjustable compensation voltage for the galvanometer circuit. The input resistance of the galvanometer may then be controlled from knob 125 and a pair of output jacks 126 and 127 are provided which connect to a suitable recorder. Where voltage integration is to be used a suitable circuit may be provided which can be connected by the on-off switch 128 and adjusted by knob 129. A power switch for the motor 52 as power switch 130 is then provided, shown in FIG. 8.

In running measurements on any particular sample, I have found that certain surface treatments of the material being tested will substantially improve the results obtained as will the preparation of the electrolytes. The speed of advancement of the wick, the cathode wire, material and the sample are also of importance.

FIRST EXAMPLE

As a first example, and where an aluminum bar having a weld therein was studied, the aluminum bar was initially prepared by etching it as clean as possible and thereafter degreasing it. More particularly, the aluminum bar which was 12″ long, 1″ wide and ⅛″ thick was dipped into an etching solution consisting of 200 gms. of $H_2SO_4$; 200 gms. $CrO_3$; 50 gms. of $HF_2NH_4$; and 550 gms. of distilled water for three minutes. The sample was theerafter rinsed with water, wiped dry and degreased with petroleum ether. It is possible, however, that other types of etching and degreasing materials could be used, as will be apparent to those skilled in the art. An electrolyte was then prepared which was a solution in distilled water of 1.5% $AlSO_4$; 9% $ClNH_4$; 7 cc. of diacetone alcohol and 3 cc. of glycerine.

The wick material was a number 40 cotton cord which was dipped in the electrolyte solution; the cord thereafter being lightly rubbed with an absorbent material to remove the excess fluid from the cord. Thereafter, the cord was wound upon bobbin 72 and threaded through the apparatus.

A silver ribbon cathode was used for ribbon 83. The ribbon 83, cotton cord 63, and aluminum sample were then advanced at a speed of the order of 1.0 mm. per second, whereupon the output voltages recorded by galvanometer 121 clearly indicated a variation in electrode potential when the weld was reached, indicating the nature of the weld.

Different samples of aluminum were also tested which included good and bad heat treatments, whereupon good heat treated regions showed a substantial difference in potential and scatter (maximum voltage fluctuation) thereby permitting for the first time, an accurate means for measuring the effectiveness of heat treatment on a sample by means other than chemically destructive tests.

SECOND EXAMPLE

Other samples that were tested include tin coated steel cans. In these measurements, the tin coated can was cleaned as well as possible as by a light etch and degreasing, and the same apparatus described in FIG. 1 was used with an electrolyte formed of a soluble stanium salt and citric acid. A detergent was added to the electrolyte along with diacetone alcohol to obtain better surface contact between the electrolyte and the sample. Again, a number 40 cotton cord was used for the wick and the apparatus was driven at the rate of 1.5 mm. per second. In this test a silver cathode was used although in both Examples 1 and 2 copper or brass wires or ribbons could be used for the cathode. The test revealed the tendency toward corrosion of various regions of the tin plated steel due to various internal stresses which are otherwise latent defects not capable of discovery. This was observed by changes in average potential as the sample was "scanned" by the apparatus as well as by changes in the measured scatter voltage.

Where iron samples are used, it is again possible to use silver, copper or brass wire cathodes with the iron surface suitably prepared and with an electrolyte formed of any soluble iron salt plus a detergent plus diacetone alcohol. A similar preparation can be used for stainless steel except that it is preferable to use only a silver cathode ribbon. In some experiments the electrolyte was delivered as a layer of consistent jelly and the cotton wick was eliminated.

Although this invention has been described with respect to its preferred embodiments, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A method of measuring stress in the surface of a metallic body comprising:
    (a) forming an electrochemical cell comprising a finite area on a metallic body as a first electrode, a second electrode, and a finite area of an electrolyte interconnecting said electrodes;
    (b) measuring the output voltage of said cell;
    (c) recording said output voltage on a recorder;
    (d) breaking said cell by disengaging the interconnection between said electrodes before polarization effects occur;
    (e) repeating steps (a) through (d) while none of the finite areas of said first electrode and of said electrolyte previously employed are re-used during the entire method to form an electrochemical cell; and
    (f) locating areas of stress in the surface of said metallic body by comparing the recorded measured output voltage of the electrochemical cells formed.

2. The method of claim 1 wherein the electrolyte is employed in the form of a wick saturated with said electrolyte.

3. The method of claim 1 wherein said electrochemical cell comprises a finite area on said metallic body as a first electrode, a finite area on a second electrode and a finite area of said electrolyte interconnecting said finite areas of said electrodes, and wherein in repeating steps (a) through (d), none of the finite areas of said electrodes and of said electrolyte previously employed are re-used during the entire method to form an electrochemical cell.

References Cited
UNITED STATES PATENTS

| | | | |
|---|---|---|---|
| 737,614 | 9/1903 | Halsey | 136—141 |
| 1,916,947 | 7/1933 | Haendel | 204—212 |
| 2,401,287 | 5/1946 | Yant et al. | 204—195 |
| 2,732,335 | 1/1956 | Glass | 204—1 T |
| 3,062,732 | 11/1962 | Keidel | 204—130 |
| 3,260,620 | 7/1966 | Gruber | 136—86 R |

TA-HSUNG TUNG, Primary Examiner

U.S. Cl. X.R.

204—195 R, 202, 206